United States Patent [19]

Mighdoll et al.

[11] Patent Number: 5,237,397
[45] Date of Patent: Aug. 17, 1993

[54] COLOR VIDEO DATA PROCESSING

[75] Inventors: Lee S. Mighdoll, Palo Alto; Mark Krueger, Cupertino; Bruce A. Leak, Palo Alto, all of Calif.

[73] Assignee: Apple Computer, Inc., Cupertino, Calif.

[21] Appl. No.: 816,310

[22] Filed: Dec. 24, 1991

[51] Int. Cl.⁵ .............................................. H04N 7/13
[52] U.S. Cl. ...................................... 358/13; 358/133; 358/426; 375/122; 382/56
[58] Field of Search .................. 358/13, 133, 136, 426; 375/122; 382/56

[56] References Cited

U.S. PATENT DOCUMENTS 5,046,119 9/1991 Hoffert .................................. 358/13
5,047,853 9/1991 Hoffert .................................. 358/13
5,164,819 11/1992 Music .................................... 358/13

Primary Examiner—Howard W. Britton
Attorney, Agent, or Firm—Blakely, Sokoloff, Taylor & Zafman

[57] ABSTRACT

A method for determining if uncompressed color video data was previously compressed and decompressed. Each block of color video data is examined to determine if the block was previously compressed with a predetermined compression algorithm that for example, selected fewer colors than were present in the original data. If it is determined that such compression has previously occurred, on recompression, a different algorithm is used to prevent introduction of color distortions.

18 Claims, 4 Drawing Sheets

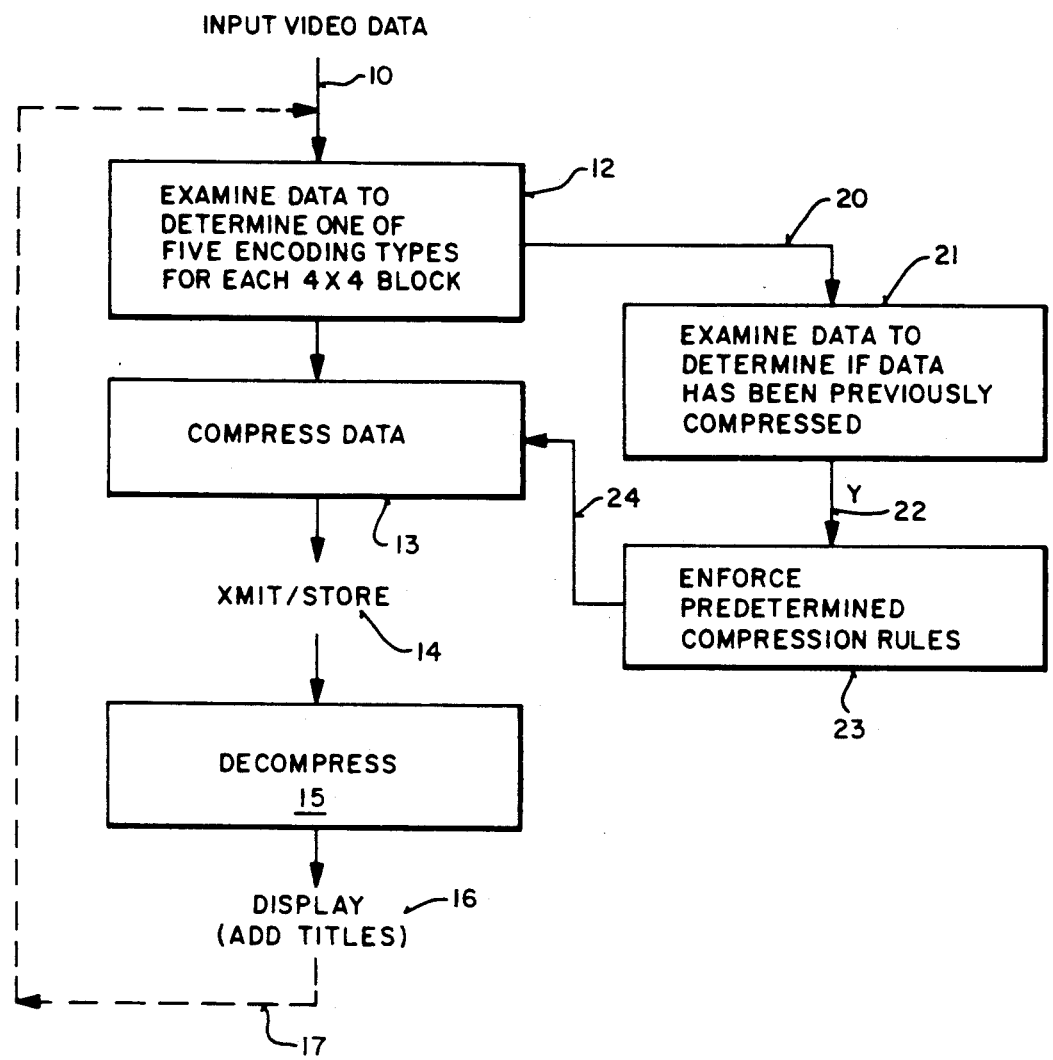
FIG_1
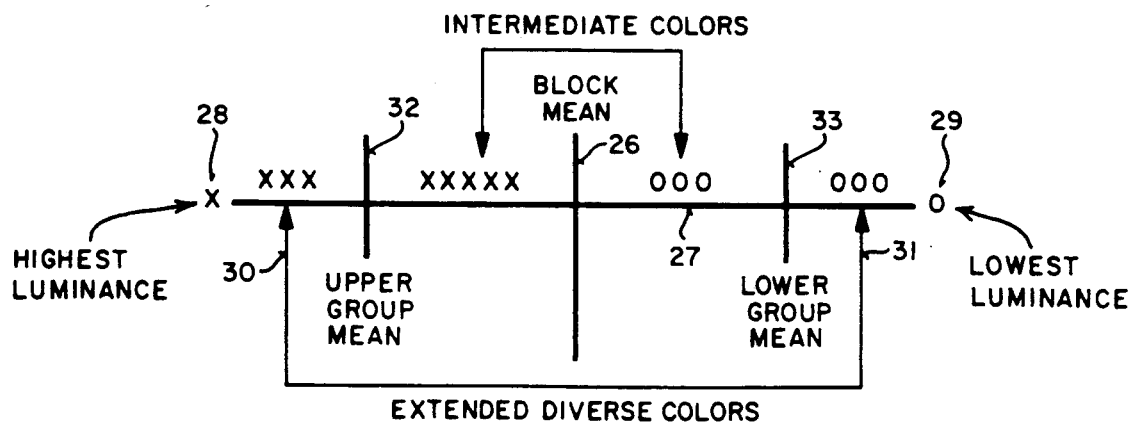
FIG_2

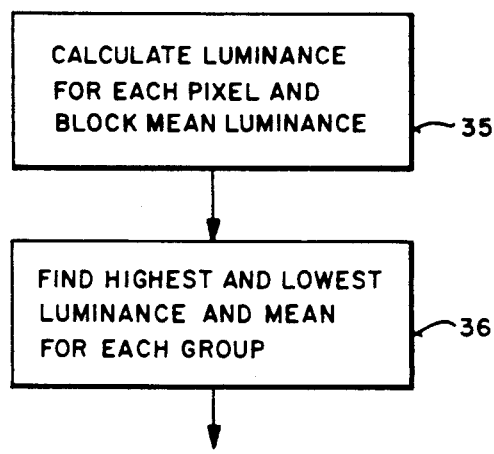
FIG_3
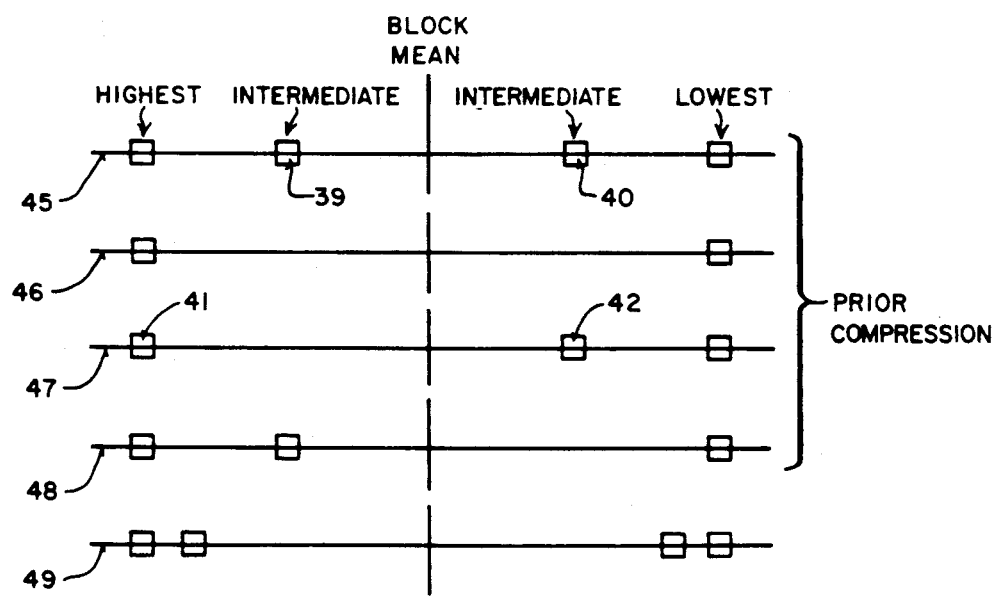
FIG_4

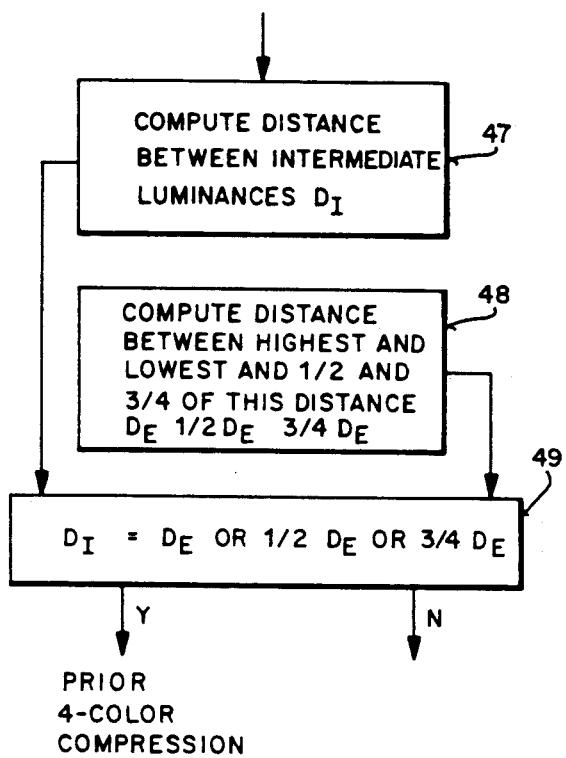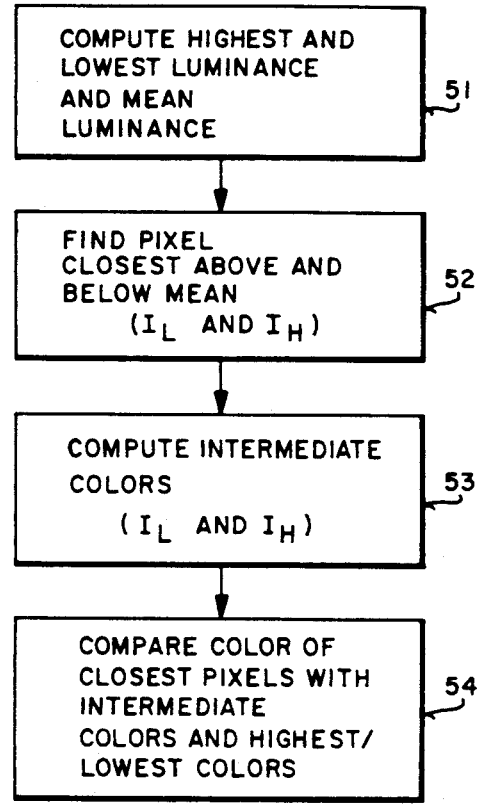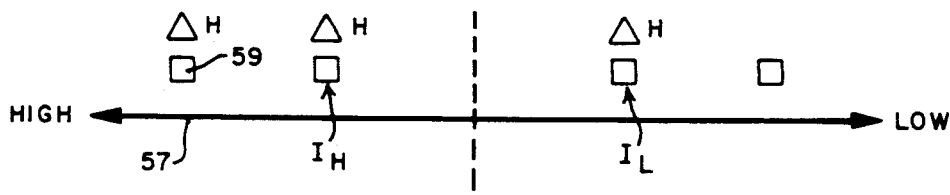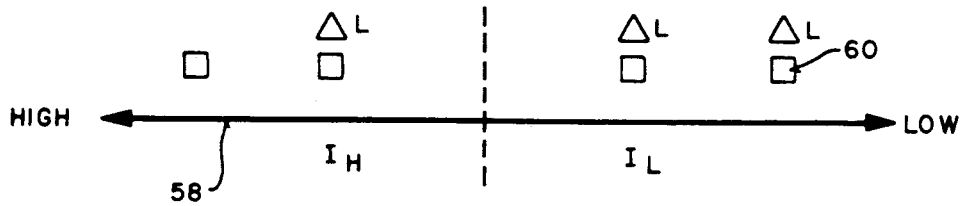

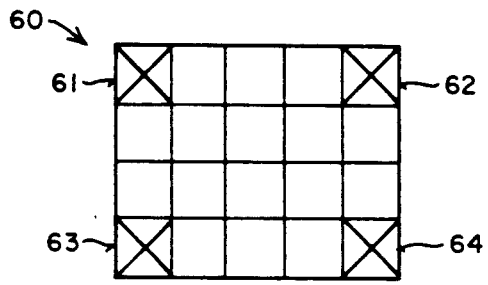
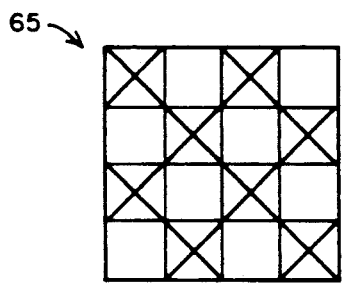
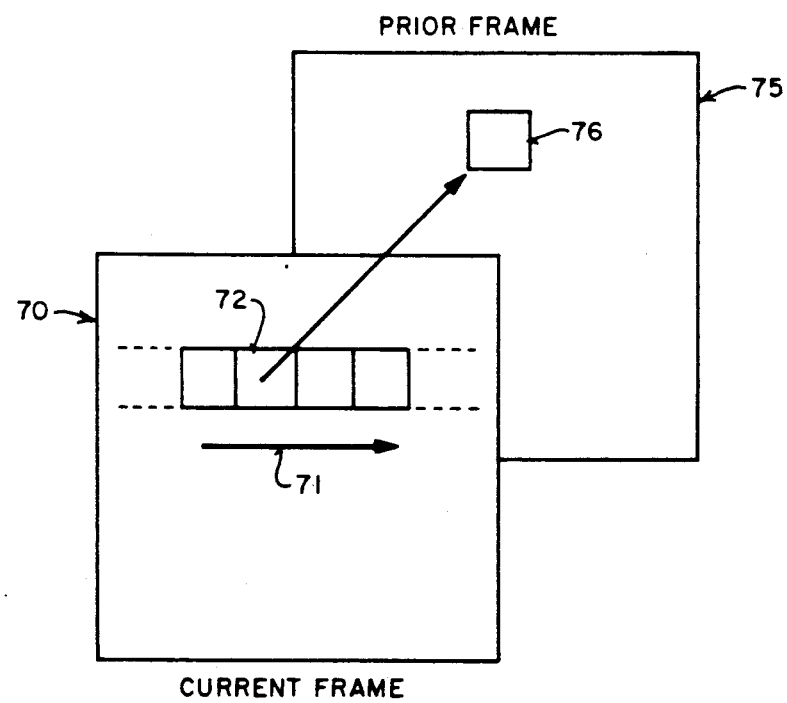

COLOR VIDEO DATA PROCESSING METHOD

1. Field of the Invention

The invention relates to the field of color video data processing.

2. Prior Art

In U.S. Pat. Nos. 5,046,119 and 5,047,853 (hereinafter the '119 and '853 patents, respectively) a method and apparatus is disclosed for compressing and decompressing color video data generally using luminance partitioning. In the method described in these patents, each 4×4 block of color video data is considered for one of four encoding types. If a block is determined to consist of a single color or close to a single color, the block is encoded as a single color. If a plurality of consecutive, single color blocks occur, additional compression is achieved by representing such blocks as a block run instruction. If the colors in a given block are numerous and diverse, the block is encoded as 16 separate colors (in effect, no compression).

The fourth encoding type described in the above patents provides anti-aliasing. Four colors are selected (by computations) to represent all the colors in a 4×4 block. A bitmap allows the selection of one of the four colors for each pixel. Only two of the four colors of the encoded data need be stored since the other two colors can be computed on decoding from the two colors that are stored. A problem that can result from the use of this encoding is described in conjunction with FIG. 1 along with the solution provided by the present invention.

SUMMARY OF THE INVENTION

In a system which receives uncompressed digital data representing color images and compresses the digital data, an improvement is described which is particularly useful where the data was previously encoded with an algorithm that selected fewer colors to represent a greater number of colors. With the method of the present invention, the decompressed data presented for compression is examined as part of the compression process to determine if it was previously encoded with the above-mentioned algorithm. If it is determined that such encoding occurred, the data is re-encoded so as to provide encoded data consistent for the prior encoding. That is, in the subsequent encoding, the selected colors are taken into account, consequently preventing color distortions.

The five encoding types used in the currently preferred method as well as other aspects of the present invention are set forth in the "Detailed Description of the Present Invention".

BRIEF DESCRIPTION OF THE DRAWINGS

FIG. 1 illustrates the steps of the present invention in conjunction with video compression. This figure also illustrates how the problem solved by the present invention occurs.

FIG. 2 is a diagram illustrating the currently preferred color encoding which selects a limited set of colors to represent the colors in an n×n block.

FIG. 3 illustrates steps used for determining if the video data was previously encoded with the encoding shown in FIG. 2.

FIG. 4 is a diagram used to describe the results obtained from following the steps shown in FIG. 3.

FIG. 5 illustrates the steps used following the steps shown in FIG. 3 to evaluate the data obtained from the steps of FIG. 3.

FIG. 6 illustrates alternate steps which may be used to determine if the data was previously encoded with the encoding illustrated by FIG. 2.

FIG. 7A is a diagram used to illustrate the data obtained and the comparisons made using the method shown in FIG. 6.

FIG. 7B is another diagram used to illustrate the data obtained and the comparisons made using the steps set forth in FIG. 6.

FIG. 8A is a diagram used to illustrate the pixels that are examined, in one method, for determining if a block of pixels is to be represented by one color.

FIG. 8B is a diagram used to illustrate the pixels that are examined, in another method, for determining if a block of pixels is to be represented by one color.

FIG. 9 is a diagram used to illustrate the fifth type of encoding used in the currently preferred method.

DETAILED DESCRIPTION OF THE PRESENT INVENTION

A method for compressing data is described and, in particular, a method for determining if the data was previously encoded using an algorithm that selected fewer colors to represent a greater number of colors in an n×n block of pixels. In the following description, numerous specific details are set forth such as specific number of pixels, specific computation algorithms, etc., in order to provide a thorough understanding of the present invention. It will be obvious, however, to one skilled in the art that the present invention may be practiced without these specific details. In other instances, well-known computational techniques and other details are not set forth in order not to obscure the present invention in detail.

As mentioned, the present invention is used with currently the compression and decompression techniques described in the '119 and '853 patents. In the following description, the currently preferred method of compressing the data is also described in addition to a problem that can result when data is compressed, decompressed and recompressed.

Currently Preferred Encoding Types

Referring first to FIG. 1, input video data presented for compression is illustrated by line 10. This is uncompressed video data representing a color image. In the currently preferred method, each 4×4 block (16 pixels) of the color video data representing an image is compressed as described below.

Each 4×4 block of pixel data is examined to determine which one of five encoding types should be used to compress the block. (The selection of which one of the four types is used for each block is discussed in the '119 and '853 patents.) The five types are: (1) encoding the block as a single color; (2) encoding a plurality of consecutive single color blocks as a single color run instruction; (3) encoding the block as four colors and a 32-bit bitmap; (4) encoding the block as 16 colors; and lastly, (5) encoding using a "no change" instruction, indicating that the block is the same as the corresponding block in the prior frame of the image.

Any one of a plurality of algorithms may be used to determine if a block consists of a single color. For instance, the two most diverse colors may be found from the 16 colors in the block and the difference between these colors compared to a user definable threshold value. If the difference between these two diverse colors is less than the threshold then the block is represented by one color. In some instances, it may be desirable not to use the two most diverse colors but rather, a color less than an extreme color in order to filter out a wild color in a 4×4 block. Alternatively, less than all the pixels represented by a n×n block may be considered, for instances, the diversity in colors between the four corner pixels of an n×n block may be considered. This is shown in FIG. 8A where in the 4×4 block 60, pixels 61, 62, 63 and 64 are considered. Still another approach is to consider alternate pixels in a block in a "checkerboard" pattern as shown by block 65 of FIG. 8B.

As currently implemented, a block mean luminance for all the colors in a 4×4 block is first determined. Next, an average luminance for those pixels above the block mean luminance (upper mean) and the average luminance for the pixels below the block mean luminance (lower mean) are considered for determining whether or not a particular block should be represented as a single color. As mentioned above, when a plurality of consecutive blocks occur all having the same color, such blocks are represented by a single color and a run instruction that indicates the number of consecutive blocks having the same color.

In the currently preferred embodiment, as mentioned the luminance for each pixel in the 4×4 block is first determined. Then a block mean luminance is computed. Following this, the pixels are segregated into two groups: those having a luminance greater than the mean luminance and those having a luminance less than the mean luminance. This is illustrated in FIG. 2 where the luminances are shown along the line 27. The block mean luminance is shown at line 26. Those pixels having a luminance greater than this mean luminance are shown by X's to the left of the mean luminance 26, with the highest being shown by luminance 28. Similarly, those pixels having a luminance less than the mean luminance 26 are shown to the right of the mean luminance 26 as circles with the lowest luminance being shown by luminance 29. The mean or average luminance of the pixels having a luminance higher than the mean luminance is computed as shown at line 32; this is referred to as the upper mean luminance. Similarly, the mean or average luminance of the pixels having a luminance less than the block mean luminance is computed and this is shown as the lower mean luminance at line 33 in FIG. 2.

When a block is to be represented by four colors and a 32-bit bitmap, two of these colors are intermediate colors found by taking a fixed ratio between the extended diverse colors. The other two colors are the extended diverse colors computed by taking: half the distance between the highest luminance 28 and the upper mean luminance 32 as shown by arrow 30; and, half the distance between the lowest luminance 29 and the lower mean luminance 33 as shown by arrow 31. While half the distance between the highest and lowest luminance and the upper and lower mean luminance, respectively are used, other distances may be used, for instance, ¼ of the distance between the highest luminance 28 and the upper mean luminance 32 and ¾ of the distance between the lowest luminance 28 and the lower mean luminance 33 could be used. The intermediate colors are found at the ⅓ and ⅔ distances between the extended diverse colors as shown in FIG. 2.

As described in the '119 and '853 patents, once the four colors are determined, each pixel is assigned one of the four colors with the 32-bit bitmap used to identify which of the four colors represents each of the pixels. In practice, only the extended diverse colors are stored along with the 32-bit bitmap. On decoding, the intermediate colors are computed from the extended diverse colors and then the bitmap used to assign each pixel in the 4×4 block its respective color.

The type of compression shown in FIG. 2 provides some color approximation since 4 colors are selected through computations to represent the 16 possible colors in the block.

The fourth encoding type used in the presently preferred method is, in effect, not to compress a particular block but rather, to represent it by 16 colors.

The fifth encoding type is a "no change" instruction, which means the block is the same as in the prior frame. As shown in FIG. 9 when the frame 70 is compressed, each block such as those shown by arrow 71 is considered in a raster fashion. Additionally, as a block is considered, such as block 72, it is compared to the corresponding block in the prior frame, such as block 76 in the prior frame 75. If the two blocks are the same, the encoded data of the prior frame for that block is used. This is signified by the "no change" instruction. "Sameness" between blocks can be determined, for instance, by comparing the uncompressed colors of the corresponding 16 pixels. This is the comparison used for a software implementation. Alternatively, the decompressed data of the previous frame may be compared to original data of the current frame. There is a peak error per pixel and a sum error for the block that are permitted, thus allowing this type of compression (no change instruction) even when the blocks are not exactly the same. Other tests for "sameness" may be used.

Overview of the Present Invention

Referring again to FIG. 1, in a typical application the incoming color video data represented by line 10 is compressed. This is shown in FIG. 1 by step 12 indicating that the preferred method examines data to determine one of the five encoding types for each 4×4 block of pixels. As illustrated by step 13, after the data is encoded it is transmitted and, for instance, stored as indicated at 14 of FIG. 1. When it becomes necessary to display the image represented by the stored compressed data, the data is decoded as shown by step 15 and displayed as shown at 16.

Most often, each time the data is to be displayed it is retrieved from storage, decoded and displayed. Consequently, the decoded data is not re-encoded but rather, the originally encoded data is used to reconstruct the image. There are instances, however, when the decoded data may be re-encoded. For example, where overlays are applied to a decompressed image (e.g., adding titles) the resultant image may be encoded and stored. This requires, as shown by dotted line 17 of FIG. 1, re-encoding, that is, encoding for a second time, data that has previously been encoded.

In accordance with the teachings of the present invention, data presented for compression is examined to determine if the data was previously compressed. This is shown in FIG. 1 by line 20 and step 21. More particularly, in the currently preferred embodiment, the data presented for compression is examined to determine if it was previously encoded using the encoding type shown in FIG. 2. As mentioned, this encoding type approximates the 16 colors in the original block by selecting 4 colors. (These four colors may not be the same as any of the original 16 colors.) If this approximation is repeatedly applied color distortion can result. Consequently, if it is determined that the data was previously encoded as indicated by the "Y" at line 22, the data is re-encoded taking into account the prior encoding.

Line 24 indicates that once it is determined that the data was previously encoded, predetermined rules are enforced to prevent, for instance, cumulative approximation errors. In the currently preferred method, each 4×4 block is examined to determine if it was previously encoded and therefore, the special encoding rules are only applied to those blocks determined to have been previously encoded.

An advantage to the present invention is that it allows the original encoding to be performed more quickly (less rigorously) since there is a built-in mechanism that prevents accumulation of distortion.

Preferred Method of Detecting Prior Encoding

Referring to FIG. 3, the first three steps used in examining the data to determine if it was previously encoded with the algorithm represented by FIG. 2 are illustrated. The steps 35 and 36 are part of the currently preferred compression algorithm and therefore occur as part of the compression process illustrated by step 12 of FIG. 1. Step 35 comprises the calculation of the luminance for each pixel and a block mean luminance for the entire block (e.g., block mean luminance 26 of FIG. 2). Next, as illustrated by step 36, the highest and lowest luminance are determined along with the upper and lower group mean luminance. Referring to FIG. 2, by way of example, the highest luminance 28, lowest luminance 29, the upper group mean luminance 32 and the lower group mean luminance 33 are found.

Following step 36, four luminances are known, specifically, the highest and lowest luminance and the luminances of the pixels closest to the block mean. The relative values of these luminances for different cases are shown in FIG. 4. The pixel closest to the upper and lower mean are referred to as upper and lower intermediate luminances, respectively below. They may or may not line up with the upper and lower intermediate colors as will be seen.

First on line 45, the four luminances could have the spacing shown on line 45. Specifically, an upper intermediate luminance 39 is located ¼ of the distance between the highest luminance and the lowest luminance, and a lower intermediate luminance 40 is located ¼ the distance between the lowest luminance and the highest luminance.

Another possibility for the four colors is that the computation resulted in only two different luminances, the highest and lowest luminance shown on line 46 of FIG. 4. It is entirely possible when representing a 4×4 block with the algorithm illustrated by FIG. 2 that one or both of the intermediate colors may not actually be used because of the peculiar spacing of the other colors. However, the extended diverse colors are always used.

Another possibility is shown on line 47 where the highest and lowest luminances are determined and a lower intermediate luminance is found which is ¼ the distance between the lowest and highest luminances. A distinct fourth luminance corresponding to the upper intermediate luminance is not found. Similarly, another possibility is shown on line 48 where again the highest and lowest luminances are found and an upper intermediate luminance is found but the lower intermediate luminance is not found. In the case shown on line 48, the upper intermediate luminance is located ¼ the distance between the highest luminance and the lower luminance.

The luminances shown on block 49 also resulting from step 37 of FIG. 3. Again a highest and lowest luminance are found. The other luminances, however, are not located at the ¼ and ¾ points between the lowest and highest luminances.

The luminance on lines 45, 46, 47 and 48 indicate that the block was previously encoded with the algorithm of FIG. 2. All other groupings of luminance such as shown on line 49 indicate that the data was not previously encoded with the encoding of FIG. 2.

The steps shown in FIG. 5 permit rapid determination of the cases shown on lines 45, 46, 47 and 48 as opposed to any other luminance distributions such as shown on line 49.

Referring now to FIG. 5, step 47 determines the distance between the intermediate luminance $D_I$. For instance, referring to line 45, the distance between the luminances 39 and 40 is computed. For the example shown on line 46, the distance between the highest and lowest luminance is computed. For the example shown on line 47, the distance between the luminances 41 and 42 is computed. As shown by step 48, the distance between the highest and lowest luminance is computed in addition to ¼ and ¾ of this distance. This is shown in step 47 as $D_E$, ¼ $D_E$ and ¾ $D_E$. Next, as shown by step 49, $D_I$ is compared to $D_E$, ¼ $D_E$ and ¾ $D_E$. If $D_I$ is equal to $D_E$ or ¼ $D_E$ or ¾ $D_E$, then it is assumed that the block was previously encoded with the algorithm shown in FIG. 2. In this event, the prior four colors are re-used in encoding. The uncompressed data presented for compression (these instances will presumably contain four colors or less). This prevents the reselection that may otherwise occur of the extended diverse colors and the resultant accumulation of distortions. If none of the equalities shown by step 49 are true, encoding proceeds unencumbered by steps 21 and 23 of FIG. 1. In this case approximation can occur if the block is to be represented by four colors.

The above method, as opposed to the alternate method which follows, relies on the accuracy of the decoding after the first encoding. In the alternate method which follows, the approximation is, in effect, recomputed and consequently the alternate method is not as dependent on the original decoding accuracy. Both methods rely on the actual use of the extended diverse colors in this block type.

Importantly, both the methods above and the one discussed below use computations used in the encoding process. Therefore, there is a sharing of results of computations that reduces overhead and speeds up processing. It allows for the testing for the prior encoding to proceed in parallel and simultaneously with the encoding.

Alternate Method of Determining Prior Encoding

FIG. 6, 7A and 7B illustrate an alternate method for determining prior encoding with the algorithm of FIG. 2. Referring first to step 51, the highest and lowest luminance and mean luminance are computed. This corresponds to luminances 28 and 29 and the block mean luminance 26 of FIG. 2. Next, as shown by step 52, by examining luminances for each pixel, the pixels closest to the mean luminance, one above and one below this mean are found. These pixels are shown as $\Delta_L$ and $\Delta_H$ in step 52. The intermediate colors are now computed. The colors (not luminance) of the pixels found to be closest to the mean luminance are compared with the intermediate colors ($I_H$ and $I_L$) and the colors associated with the highest and lowest luminance. This first requires the calculation of the intermediate colors. First, as shown in FIG. 7A the color of the pixel closest to the mean luminance but higher than the mean luminance ($\Delta_H$) is compared to $I_H$ and $I_L$. The color $\Delta_H$ must be equal to the color of the highest luminance (pixel 59) or $I_H$, or $I_L$. Also, $D_L$ must be equal to the color of the pixel having the lowest luminance (60 of FIG. 7B) or $I_H$, or $I_L$. Both the condition shown on line 57 of FIG. 7A and the condition shown on line 58 of FIG. 7B must be true if the block was previously encoded.

If it is found that the condition of FIGS. 7A and 7B are met, on recompression the color selection of FIG. 2 is not used as was the case with the previous method of detecting prior compression. Rather $I_H$, $I_L$, $D_H$ and $\Delta_L$ are used if the block is to be represented by four colors.

The above preferred methods detect prior encoding with the encoding type of FIG. 2. For the currently preferred method there is no distortion introduced by re-encoding with the other encoding types even if the user settable threshold values are set differently for the second encoding. For instance, a different threshold setting may cause a block previously encoded as 16 colors to be re-encoded as four colors. This would not introduce undue distortions.

The above preferred method is described for an approximation that occurs when four colors are selected to represent as many as 16 colors. The method may also be useful for detecting known video processing which was previously used on data such as, emphasizing a particular hue (color enhancement). The prior processing is more readily detectable when it leaves some "tracers" in the image such as a predetermined distribution of colors. On detection of the prior processing re-enhancement of a particular hue, for instance, would not be reused.

Thus, a method has been described which prevents the introduction of distortions during the encoding of color video data where the data was previously encoded.

We claim:

1. An improved method for use in a system which receives uncompressed digital data and compresses the digital data, comprising the steps of:
   determining if the digital data has been previously compressed and decompressed with a predetermined type of compression; and,
   compressing the digital data so as to provide compressed data consistent with said predetermined type of compression, if it is determined that the digital data has been previously compressed with said predetermined type of compression.

2. The improved method defined by claim 1 within said determining steps occurs for predetermined blocks of the digital data.

3. The improved method defined by claim 2 wherein said predetermined type of compression provides data approximation.

4. The improved method defined by claim 2 wherein said data approximation is color approximation.

5. An improved method for use in a system which receives uncompressed digital data and compresses the digital, comprising the steps of:
   determining if the digital data has been previously compressed and decompressed with a predetermined algorithm;
   compressing the digital data with an algorithm different than said predetermined algorithm if it is determined that the digital data has been previously compressed and decompressed with said predetermined algorithm.

6. The improved method defined by claim 5 within said determining steps occurs for predetermined blocks of the digital data.

7. The improved method defined by claim 6 wherein said predetermined algorithm comprises selecting fewer colors than are found in said predetermined blocks of digital data.

8. An improved method for use in a system for encoding color digital data comprising the steps of:
   determining if the digital data has previously undergone encoding and decoding which included the selection of fewer colors than present in the digital data;
   encoding the digital data so as to select at least one different color than would be selected if the data has not been previously encoded when it is determined that the digital data has been previously encoded and decoded.

9. The improved method defined by claim 8 wherein the determining step includes examining the luminance of certain pixels.

10. The improved method defined by claim 9 wherein the determining step occurs for n×n blocks of pixel data.

11. A method for encoding color video data comprising the steps of:
    encoding the color video data; and
    simultaneously examining the color video data to determine if it was previously encoded.

12. An improved method for use in a system for processing video data comprising:
    determining if the data has been previously processed with predetermined processing;
    processing the data differently than said predetermining processing when it is determined that the data have been previously processed with said predetermined processing.

13. The improved method defined by claim 12 wherein said predetermined processing comprises data compression.

14. The improved method defined by claim 12 wherein said predetermined processing comprises data enhancement.

15. A method for compressing n×n blocks of color video data comprising:
    examining the data in each of the n×n blocks to select one of five encoding types to provide encoded data that represents the data in each of the blocks; and,
    examining the data to determine if it was previously encoded with at least one of said five encoding types.

16. The method defined by claim 15 wherein said five encoding types comprise:
    (a) representing an n×n block as a single color;

(b) representing consecutive n×n blocks of the same single color by the single color and a run instruction;
(c) representing an n×n block by four colors and a 2 (n×n)-bit bitmap;
(d) representing an n×n block as n×n colors; and,
(e) representing the n×n block with an instruction indicating that the encoded data of the prior frame for the corresponding block should be used.

17. A method for encoding blocks of video color data comprising:
examining each block of data;
selecting one of the following five encoding types for each block;
(a) representing an n×n block as a single color;
(b) representing consecutive n×n blocks of the same single color by the single color and a run instruction;
(c) representing an n×n block by four colors and a 2 (n×n)-bit bitmap;
(d) representing an n×n block as n×n colors; and,
(e) representing the n×n block with an instruction indicating that the encoded data of the prior frame for the corresponding block should be used.

18. The method defined by claim 17 wherein each block comprises data for n×n pixels and said examination step examines fewer than n×n pixels to determine if said representation of said n×n block as a single color is to be used.

* * * * *